Aug. 3, 1965  C. K. BROWN  3,198,303
ROTARY IMPACT TOOL
Filed Jan. 6, 1964  6 Sheets-Sheet 1

FIG. 1

INVENTOR.
CHRISTOPHER K. BROWN
BY
David W. Tillott
ATTORNEY

Aug. 3, 1965 C. K. BROWN 3,198,303
ROTARY IMPACT TOOL
Filed Jan. 6, 1964 6 Sheets-Sheet 2

INVENTOR.
CHRISTOPHER K. BROWN
BY
David W. Tillett
ATTORNEY

INVENTOR.
CHRISTOPHER K. BROWN
BY
David W. Tibbott
ATTORNEY

Aug. 3, 1965  C. K. BROWN  3,198,303
ROTARY IMPACT TOOL
Filed Jan. 6, 1964  6 Sheets-Sheet 4

INVENTOR.
CHRISTOPHER K. BROWN
BY
David W. Tillott
ATTORNEY

Aug. 3, 1965

C. K. BROWN 3,198,303

ROTARY IMPACT TOOL

Filed Jan. 6, 1964

INVENTOR.
CHRISTOPHER K. BROWN
BY
David W. Tibbitt
ATTORNEY

United States Patent Office 3,198,303
Patented Aug. 3, 1965

3,198,303
ROTARY IMPACT TOOL
Christopher K. Brown, Camp Hill, Pa., assignor to Ingersoll-Rand Company, New York, N.Y., a corporation of New Jersey
Filed Jan. 6, 1964, Ser. No. 338,556
13 Claims. (Cl. 192—30.5)

This application is a continuation-in-part of my U.S. application, Serial No. 269,550, filed April 1, 1963, now abandoned.

This invention relates to a power-operated rotary impact tool for applying rotary or angular impacts to fasteners such as threaded nuts, bolts, etc. In particular, this invention relates to a rotary impact tool mechanism for changing the rotating torque of a rotary motor, such as an air-driven motor, to a series of rapid rotary impacts which can be applied to a threaded nut for either driving it tight or for removing it.

Most rotary impact mechanisms in use today contain an anvil adapted to be connected to a wrench socket and a hammer rotated by a motor. The hammer is alternately engaged and disengaged from the anvil, being engaged to impact the anvil, thereafter being disengaged from the anvil to gather rotary speed again prior to striking another impact to the anvil. Various means are used for accomplishing this alternate engagement and disengagement between the anvil and hammer.

One well known impact mechanism used today is known as the "Pott" mechanism, being named after the inventor who received U.S. Patent Nos. 2,012,916, 2,049,273 and 2,158,303. A modern version of the "Pott" mechansim is shown in the U.S. patent to Jimerson, No. 2,160,150. In the Jimerson patent, the hammer is mounted on a shaft driven by a motor and cam balls are mounted between the hammer and the shaft with the cam balls resting in V-shaped grooves formed on the shaft. Normally, a coil spring biases the hammer into engagement position with the anvil wherein the cam balls rest in the apexes of their grooves. After the hammer strikes the anvil, the shaft continues to rotate and the relative rotation between the shaft and hammer causes the cam balls to ride up their grooves and pull the hammer axially rearward to disengagement position, thus compressing and storing potential energy in the hammer biasing spring. When the hammer is disengaged from the anvil, the combined energy in the compressed spring and the rotating shaft turns the hammer forward to deliver another impact to the anvil.

One disadvantage usually found in impact mechanisms using the concept of the Pott and Jimerson patents is that looseness or play can exist in the drive between the anvil and fastener before each impact. Such looseness results in an inefficient transfer of impact force from the anvil to the fastener.

Another well known impact mechanism is disclosed in the U.S. patent to Amtsberg, No. 2,881,884. In this mechanism, the hammer is spring-biased axially away from the anvil to a disengaged position and cams operated by the relative rotation between the anvil and hammer cause the hammer to be periodically thrown axially forward to strike a rotary impact with the anvil.

One disadvantage of the above Amtsberg mechanism is that if the hammer is driven slower than its design speed, the hammer teeth will not be thrown far enough axially forward to engage the anvil teeth properly upon impact. When the hammer teeth are not thrown far enough forward, they "top" or barely strike the anvil teeth which causes rapid wear of such teeth.

The principal object of this invention is to provide an impact mechanism which eliminates the disadvantages of the fore-going mechanisms and which operates according to an entirely new concept.

Other important advantages include the following: to provide a rotary impact mechanism which inherently removes looseness between the anvil and fastener prior to each impact; to provide a rotary impact mechanism which prevents the hammer from striking the anvil before it reaches its proper rotative speed; to provide a hammer mechanism which reduces friction tending to hold the hammer against the anvil after impact, this friction acting to slow the disengagement of the hammer from the anvil; and to provide a rotary impact mechanism which prevents the hammer from rebounding after impact and striking a secondary blow to the anvil.

The above objects are attained in an impact mechanism wherein the hammer is biased to normal engagement or impact position with the anvil and a pair of cam elements, including a cam and cam follower, are arranged between the anvil and hammer for normally raising the hammer clear of the anvil immediately before each impact. One of the cam elements is mounted by a resilient connection which allows it to move relative to the member that it is carried by, either the anvil or the hammer, so that when the cam elements engage each other at high rotary speed, they are unable to move the hammer out of the way of the anvil fast enough to prevent an impact. Thus, the cam elements and the resilient cam element mounting prevent the hammer from impacting the anvil at low rotary speed of the hammer while they allow the hammer to strike the anvil at high rotary speed of the hammer.

The invention is disclosed in the accompanying drawings wherein.

FIRST EMBODIMENT—FIGS. 1 TO 8

Figure 1:
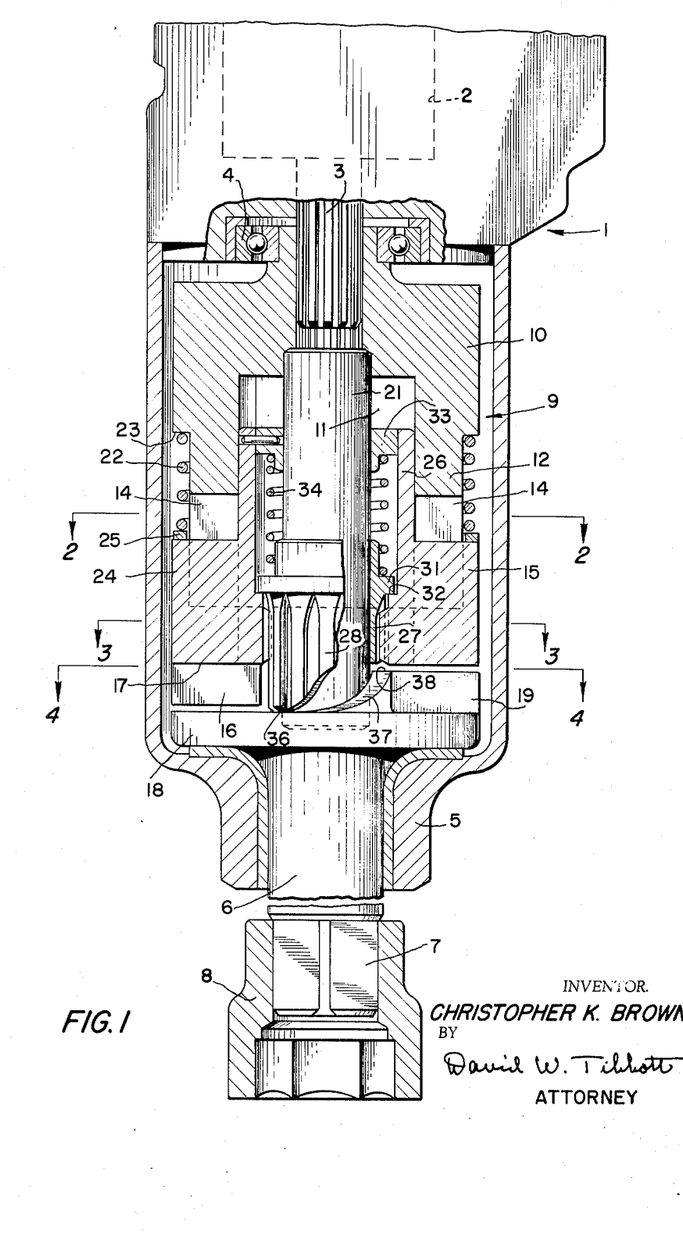
FIG. 1 is a longitudinal section with parts being broken away of one embodiment of rotary impact mechanism following the concepts of this invention.
Figure 2:
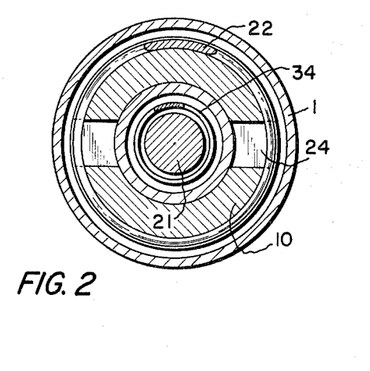
FIG. 2 is a section of FIG. 1 taken along line 2—2.
Figure 3:
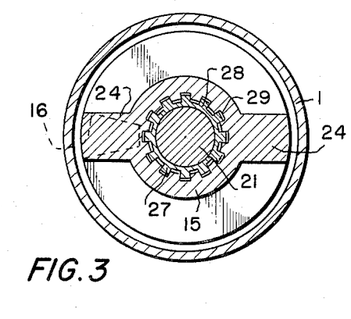
FIG. 3 is a section of FIG. 1 taken along line 3—3.
Figure 4:
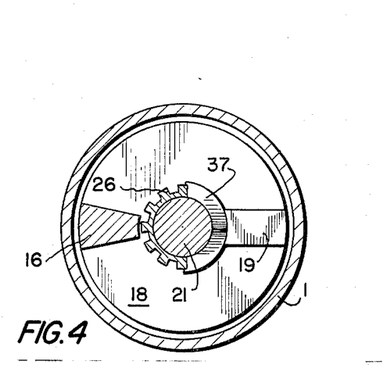
FIG. 4 is a section of FIG. 1 taken along line 4—4.
Figure 5:
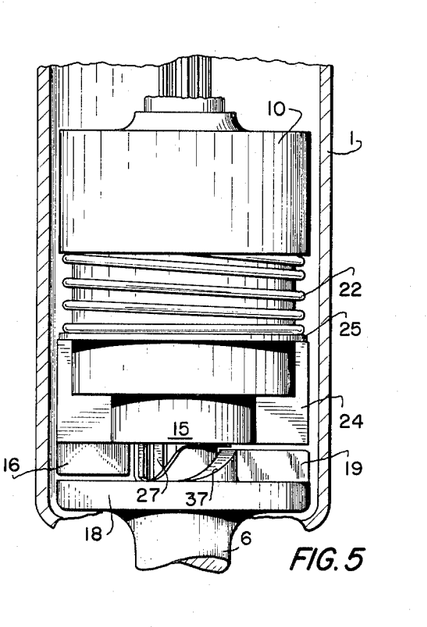
FIG. 5 is an elevational view of the impact mechanism of FIG. 1.

The rotary impact tool shown in FIG. 1 conventionally includes a casing 1 containing a rotary motor 2, shown in dotted lines, having a motor shaft 3 rotatively mounted in a bearing 4. The motor 2 should be of a type which can be repeatedly stalled without being damaged, such as an air motor. The casing 1 further includes a front nose 5 containing a spindle 6 rotatively mounted therein. The spindle 6 has a square front end 7 adapting it for fitting into a nut driving socket such as the socket 8 shown in FIG. 1. The spindle 6 is interconnected to the motor shaft 3 by an impact mechanism 9 which changes the rotary torque of the motor 2 into a series of rotary impacts. This invention involves the impact mechanism 9, which is one embodiment of the invention.

The impact mechanism 9 includes a hammer rotor 10 of relatively large mass splined to the motor shaft 3. Thus, the hammer rotor 10 is fixed to and is rotatively driven by the motor 2. The hammer rotor 10 is cup-shaped with a forwardly opening central cavity 11 surrounded by an annular rim or wall 12. The annular wall 12 is provided with a pair of axially extending slots 14 which open forwardly and are located diagonally opposite each other on the circumference of the annular wall 12. A hammer dog 15 is mounted in the slots 14 for axial sliding movement and includes a radially extending tooth 16 projecting forwardly from its front face 17.

The spindle 7 is fixed at its rear end to an anvil 18 which has a rearwardly and radially projecting anvil tooth 19 adapted to engage the hammer dog tooth 16 for creating an impact blow. The anvil 18 and the hammer rotor 10 are coaxially aligned by an axle 21 which runs axially between both and rotatably fits in corresponding seats in both members. The axle 21 is merely an alignment means running between the anvil 18 and hammer rotor 10 and it does not transmit any torque load. Both the anvil 18 and hammer rotor 10 are free to turn relative to the axle 21.

Whether or not the hammer dog tooth 16 impacts the anvil tooth 19 depends on the axial position of the hammer dog 15 in the hammer rotor 10. Moving the hammer dog 15 forward to place the hammer dog tooth 16 in the rotary path of the anvil tooth 19 causes the two to collide as the hammer rotor rotates. The hammer dog 15 can be moved axially rearward in the hammer rotor 10 to remove the hammer dog tooth 16 from the rotary path of the anvil tooth 19 so that the teeth clear each other as the hammer rotor 10 rotates. In the latter case, there is no impact.

The hammer dog 15 is normally biased forwardly on the hammer rotor 10 by a light coil spring 22 which surrounds the hammer rotor 10. The front half of the hammer rotor 10 is reduced in diameter to form a shoulder 23 abutting the rear end of the coil spring 22. The radial wings 24 of the hammer dog 15, sliding in the slots 14, project radially beyond the circumference of the hammer rotor 10. A washer 25 abuts the rear edges of the wings 24 and seats against the forward end of the spring 22. Thus, the spring 22 acts between the rear edges of the hammer dog wings 24 and the shoulder 23 on the hammer rotor 10.

The hammer dog 15 includes an integral sleeve 26 slidably projecting rearwardly into the cavity 11 of the hammer rotor 10 and slidably surrounding a tubular cam follower 27 which is rotatable and slidable on the central axle 21. The tubular cam follower 27 is splined to the hammer dog 15 by splines 28 on its periphery engaging in corresponding internal flutes 29 provided on the hammer dog 15. Thus, the cam follower 27 can slide relative to the hammer dog 15 but is forced to rotate with it. The cam follower 27 is provided with an enlarged annular rib 31 adjacent its rear end for seating against an internal shoulder 32 provided on the hammer dog 15 to limit the forward movement of the cam follower 27 relative to the hammer dog 15.

An internal ring 33 is attached to the rear end of the hammer dog sleeve 26 and a coil spring 34 is engaged between the ring 33 and the rear end of the cam follower 27; thus, the spring 34 biases the cam follower 27 forwardly in the hammer dog 15 to press the annular rib 31 on the cam follower 27 against the internal shoulder 32 on the hammer dog 15. The spring 34 should be relatively stronger than the light spring 22 so that when the cam follower 27 is moved rearwardly, its movement will be transferred through the spring 34 to the hammer dog 15 to move the hammer dog rearwardly and compress the light spring 22, as shown in FIG. 6.

Figure 6:
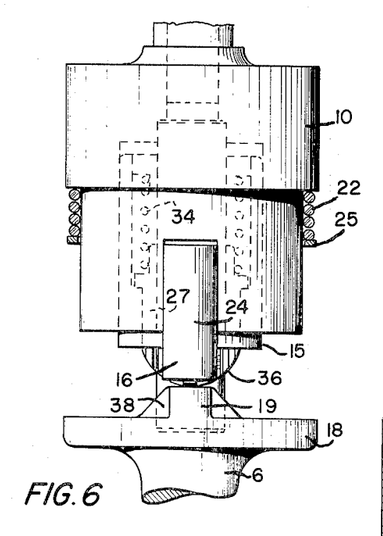
FIG. 6 is an elevational view of the impact mechanism of FIG. 1 shown as the hammer tooth clears the anvil.

The front end of the tubular cam follower 27 is formed with a forwardly projecting cam follower lobe 36 which is angularly positioned in radial alignment with the hammer dog tooth 16 as shown in FIG. 6. The cam follower lobe 36 rides on an annular cam follower surface 37 integrally formed on the anvil 18. The annular cam surface 37 includes a rearwardly projecting cam lobe 38 which is angularly positioned in radial alignment with the anvil tooth 19. The height of the two lobes 36 and 38 are dimensioned so that the tubular cam follower 27 and the hammer dog 15 will be cammed far enough rearwardly, as the hammer and anvil teeth 16 and 19 approach each other at a relatively slow speed, to cause the teeth 16 and 19 to clear each other, as shown in FIG. 6. In other words, if the cam follower 27 is pushed rearwardly relatively slowly, the lobes 36 and 38 are high enough for the cam follower 27 to move the hammer dog 15 enough for the teeth 16 and 19 to clear each other, without an impact. Such action occurs only when the hammer is rotating at a relatively slow speed.

Figure 7:
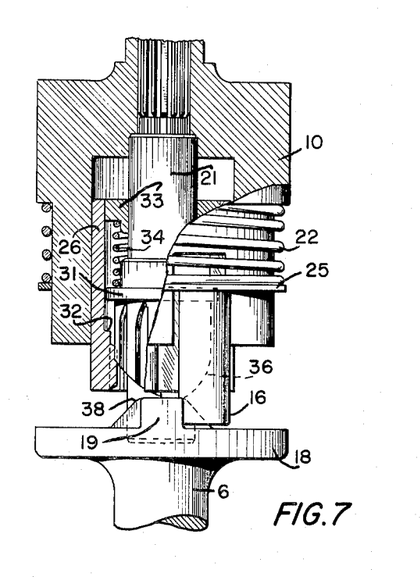
FIG. 7 is an elevational view with parts being broken away showing the impact mechanism immediately prior to impact of the hammer with the anvil.
Figure 8:
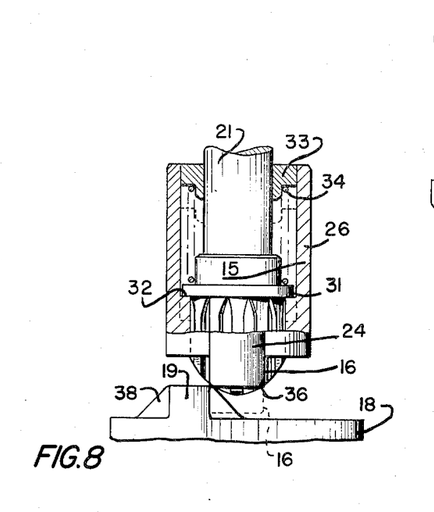
FIG. 8 is a fragmentary section showing the hammer cam element in its normal position relative to the hammer dog, also containing dotted lines showing the position of the hammer dog relative to its cam element during impact.

When the cam follower 27 is abruptly pushed rearwardly at a high speed, such as happens when the hammer rotor 10 is rotating at a relatively high speed, the spring 34 cannot transmit the abrupt motion of the cam follower 27 to the hammer dog 15 quick enough to move the hammer dog tooth 16 out of the path of the anvil tooth 19; hence the teeth 16 and 19 impact each other. Instead of the spring 34 acting as a rigid member, it acts as a resilient member and compresses under high inertial loads caused by the high speed movement of the cam follower 27 and the mass of the hammer dog 15 which tends to resist the spring 34. The latter condition is illustrated in FIG. 7. Hence, the impact mechanism 9 provides the advantage of preventing an impact from taking place when the hammer rotor 10 is rotating at a slow speed, thus allowing the hammer rotor 10 to gain a high speed before impacting the anvil.

OPERATION OF EMBODIMENT IN FIGS. 1 TO 8

To prepare the impact tool of FIG. 1 for operation, it is fitted with a socket 8 of the correct size to fit the nut or bolt which is going to receive the socket 8. For convenience, it is assumed that the workpiece is a nut which should be tightened. The impact tool is initially adjusted to drive the nut in a clockwise or tightening direction.

Thereafter, the impact tool is manipulated to fit the socket 8 over the nut and the motor 2 is suitably energized, depending on the type of motor. As the motor begins to rotate, the hammer rotor 10 rotates the hammer dog 15 and the tubular cam follower 27 to cause the lobe 36 on the cam follower 27 to engage the lobe 38 on the anvil 18. Thereafter, the hammer rotor 10 drives the anvil 18 through the lobes 36 and 38 until the nut is tight enough to develop a torque resistance sufficient to cause the lobes 36 and 38 to ride over each other. The amount of torque sufficient to cause the lobes 36 and 38 to ride over each other is dependent on the strength of the spring 22.

As the torque load rises to a magnitude to cause the cam follower lobe 36 to ride up and over the anvil cam lobe 38, the rearward movement of the tubular cam follower 27 is transmitted through the spring 34 to the hammer dog 15 to cause the hammer dog to move rearwardly substantially in unison with the cam follower 27. The rearward movement of the hammer dog 15 lifts the hammer dog tooth 16 clear of the anvil tooth 19 so that they fail to collide and impact. It is important to recognize that the reason for the substantially simultaneous movement of the cam follower 27 and the hammer dog 15 in this instance is because of the relatively slow rearward speed of the cam follower 27 as it is forced rearward by the cam follower lobe 36 riding over the anvil cam lobe 38.

After the cam follower lobe 36 clears the cam lobe 38, the hammer rotor 10 can turn freely for substantially a full turn before the lobes 36 and 38 again engage. Thus, the hammer rotor 10 can develop a substantially high rotative speed during its freedom from load.

As the hammer rotor 10 completes its single revolution free from load, the cam follower lobe 36 on the tubular cam follower 27 approaches and engages the cam lobe 38 on the anvil 18 at a relatively high speed. This high speed engagement between the lobes 36 and 38 causes the tubular cam follower 27 to be abruptly thrust axially rearward. The spring 34 is incapable of transmitting the abrupt movement of the cam follower 27 to the hammer dog 15; thus, the hammer dog 15 lags behind the cam follower 27 and the spring 34 is compressed as shown in FIG. 7. One reason for this lag in movement of the hammer dog 15 is its mass which resists being accelerated by the force transmitted through the spring 34.

The lag in movement of the hammer dog 15 relative to the tubular cam follower 27 causes the hammer dog tooth 16 to collide with the anvil tooth 19 and deliver a rotary impact to the spindle 6 and socket 8.

The motor 2 and hammer rotor 10 are substantially slowed or stopped altogether because of the impact between the teeth 16 and 19. If the nut is not very tight, the hammer and anvil may rotate a substantial amount together before the hammer is disengaged from the anvil. If the nut is tight, the hammer will come to a dead stop and may even rebound, depending on the resistance that the nut offers against being additionally tightened. After impact, the compressive load on the spring 34, caused by the rearward movement of the tubular cam follower 27 prior to impact, acts to pull the hammer dog 15 rearwardly so that the hammer dog tooth 16 clears the anvil tooth 19. Once, the hammer dog tooth 16 clears the anvil tooth 19, the motor 2 and hammer rotor 10 are free from load to rotate for another revolution. Thus, the hammer rotor 10 can again attain a relative high rotative speed before delivering a successive impact to the anvil 18.

If for some reason, the motor 2 does not deliver enough torque to bring the hammer rotor 10 up to sufficient speed in one revolution, the hammer dog tooth 16 will clear the anvil tooth 19 after the first revolution and thus allow the hammer rotor 10 to continue rotating free from load until it reaches the proper speed for impact. This is one of the highly desirable features of this impact mechanism.

Another desirable feature of the foregoing impact mechanism is that the engagement of the lobes 36 and 38 immediately prior to impact "snubs" or removes any looseness existing between the spindle 6, socket 8 and nut so that the impact can be more efficiently delivered to the nut. This "snubbing" is caused by the slight torque load applied to the anvil by the engagement of the lobes 36 and 38 just before impact.

Figure 9:
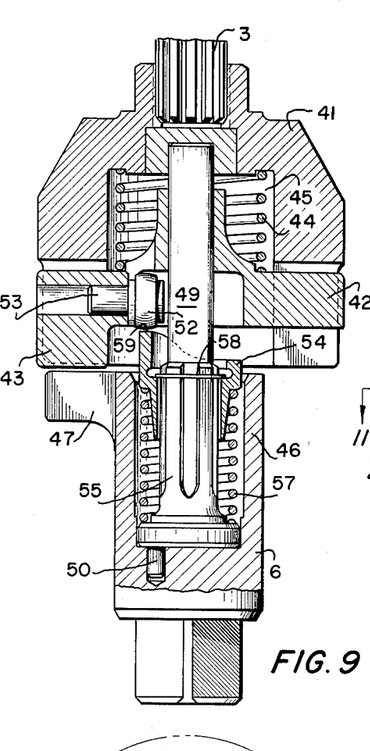
FIG. 9 is a longitudinal section of another embodiment of impact mechanism shown as the hammer clears the anvil.
Figure 10:
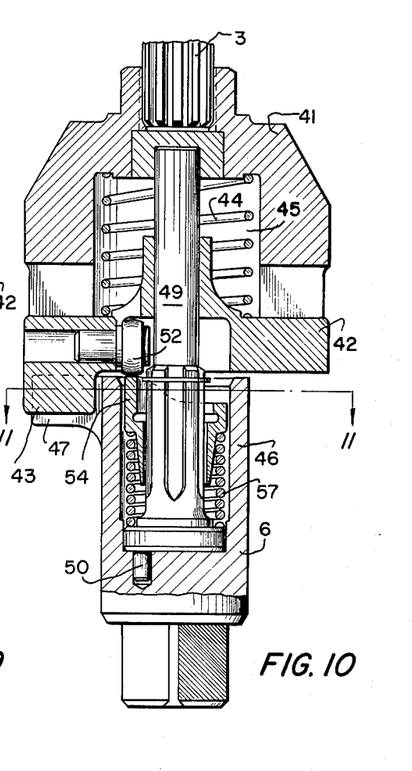
FIG. 10 is a section of the FIG. 9 mechanism shown immediately before impact.
Figure 11:
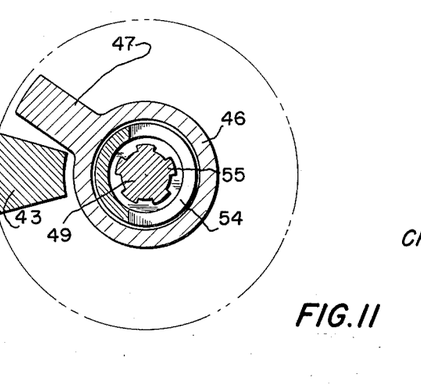
FIG. 11 is a section of FIG. 10 taken along the line 11—11.

SECOND EMBODIMENT—FIGS. 9 TO 11

This embodiment differs from the first embodiment by having the anvil cam resiliently mounted on the anvil so that it can move axially relative to the anvil to permit an impact to occur. The concept of operation remains essentially the same as takes place in the first embodiment.

The second embodiment includes a hammer rotor 41 splined to a motor shaft 3 in substantially the same manner as in the first embodiment. The hammer rotor 41 carries an axially sliding hammer dog 42 keyed to the hammer rotor 41 and having a forwardly projecting hammer dog tooth 43. The hammer dog 42 is biased axially forward by a spring 44 located between the hammer dog 42 and hammer rotor 41 in a central cavity 45 formed in the hammer rotor 41.

The anvil 46 is integrally fixed on the rear end of the spindle 6 and includes an anvil tooth 47 projecting from the anvil whereby it can be engaged by the tooth 43 on the hammer dog 42 under certain conditions.

The anvil 46 contains a central cavity 48 opening rearwardly and a central shaft 49 is mounted in the cavity 48. The shaft 49 extends rearward into the hammer rotor 41 and is rotatably seated at its rear end in a seat fixed in the bottom of the hammer cavity 45. The shaft 49 is keyed to the anvil 46 by an axially offset pin 50 fixed to the front end of the shaft 49 and seating in a corresponding offset hole in the bottom of the anvil cavity 48. Thus, the shaft 49 cannot rotate relative to the anvil 46.

A cam roller 52 is fixed to the interior of the hammer dog 42 to rotate on a radially mounted pin 53. The cam roller 52 rides on a tubular cam 54 which is slidably mounted on the shaft 49. The tubular cam 54 is non-rotatably mounted on the shaft 49 by means of splines 55 on the shaft engaging corresponding internal flutes on the cam 54; thus the angular relationship of the cam 54 relative to the anvil 46 does not change.

The tubular cam 54 is biased rearwardly by a spring 57 mounted between the cam 54 and the front end of the shaft 49. A resilient lock ring 58 is seated in an annular slot in the shaft 49 and serves as a stop to limit the rearward movement of the cam 54. The spring 57 is substantially stronger than the spring 44 for reasons which will become apparent in the following description.

The tubular cam 54 includes a rearwardly projecting lobe 59 which is angularly located in alignment with one of the anvil teeth 47. As the hammer rotor 41 rotates, cam roller 52 rides on the tubular cam 54 and its cam lobe 59. If the hammer rotor 41 rotates at a relatively slow speed, the cam roller 52 will ride up to the cam lobe 59 and move the hammer dog 42 rearward sufficiently for the hammer dog tooth 43 to clear the anvil tooth 47 without an impact taking place. The spring 57 will be strong enough to resist any movement of the tubular cam 54 when the hammer rotor 41 rotates at a relatively slow speed.

On the other hand, when the hammer rotor 41 rotates at a high speed, the cam roller 52 strikes the cam lobe 59 abruptly so that the tubular cam 54 moves forwardly, as shown in FIG. 10, before the hammer dog 42 begins moving rearwardly. Thus, the hammer dog tooth 43 fails to move out of the path of the anvil tooth 47 and they collide with each other to deliver an impact to the anvil 46. The forward movement of the tubular cam 54 relatives to the anvil 46 compresses the spring 57. Immediately after impact, the compression load on the spring 57 acts to push the cam 54 rearwardly and to lift the hammer dog 42 clear of the anvil 46 whereby the hammer rotor 41 can gain sufficient speed before striking another impact to the anvil 46.

It is believed that the foregoing makes it clear that the operation of the second embodiment is essentially the same as the first embodiment and that the main difference between these embodiments is that the first embodiment has the hammer cam resiliently mounted on the hammer dog while the second embodiment has the anvil cam resiliently mounted on the anvil.

Figure 12:
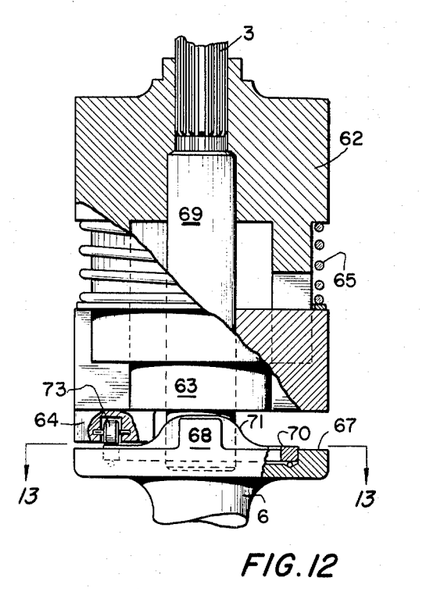
FIG. 12 is a fragmentary elevational view of a third embodiment of impact mechanism with portions being broken away.
Figure 13:
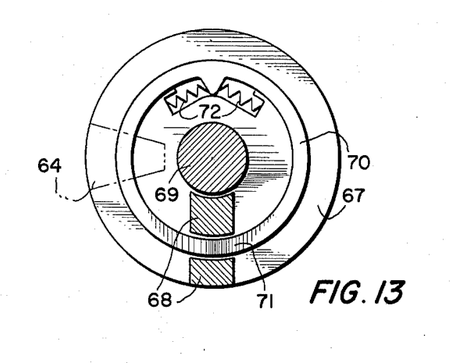
FIG. 13 is a section of FIG. 12 taken along the line 13—13.
Figure 14:
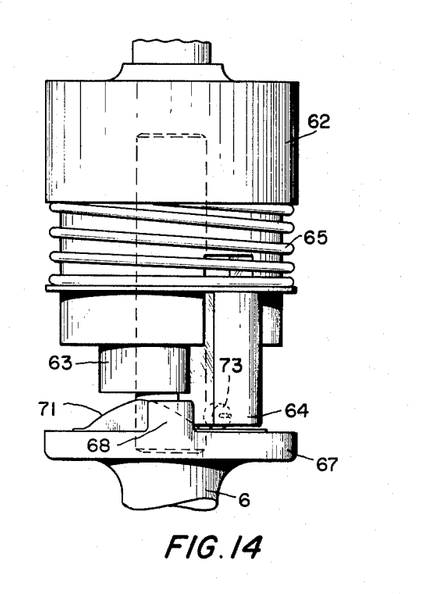
FIG. 14 is an elevational view of the FIG. 12 mechanism shown immediately prior to impact.

THIRD EMBODIMENT—FIGS. 12 TO 14

The third embodiment differs from the second embodiment by having the anvil cam mounted on the anvil to rotate relative to the anvil when under shock, instead of being mounted to move axially relative to the anvil as is the case in the second embodiment.

A hammer rotor 62 is splined to a motor shaft 3 in the same way as in the first and second embodiments. The hammer rotor 62 contains an axially slidably dog 63 keyed to the hammer rotor 62 and having a hammer dog tooth 64 projecting forwardly. The hammer dog 63 is biased forward by a spring 65 which encircles the hammer rotor 62 in substantially the same manner as in the first embodiment.

The spindle 6 integrally carries an anvil 67 at its rear end having an anvil tooth 68 adapted to engage the hammer dog tooth 64 to create an impact. An axle 69 runs coaxially between the anvil 67 and the hammer rotor 62 and fits in rotatable seats in both of these members.

The rear face of the anvil 67 contains a concentric annular groove containing an annular cam 70 having a cam lobe 71 protruding rearwardly. The cam lobe 71 is normally angularly located in radial alignment with the anvil tooth 68. The annular cam 70 can rotate relative to the anvil 67 through a limited angle in either rotary direction from its normal position. As seen in FIG. 13, the annular cam 70 is biased to its normal position by a pair of springs 72 mounted on the anvil 67. A roller 73 mounted on the hammer dog 63 rides on the annular cam 70 and cam lobe 71.

When the hammer rotor 62 rotates at a relatively slow speed, the roller 73 rides up the cam lobe 71 and lifts the hammer dog 63 rearwardly far enough for the hammer dog tooth 64 to clear the anvil tooth 68 without an impact taking place.

However, when the hammer rotor 62 rotates at a relatively high speed, the roller 73 strikes the cam lobe 71 abruptly and causes the annular cam 70 to rotate relative to the anvil 67, while the hammer dog 63 momentarily remains in a forward position where the hammer dog tooth 64 collides with the anvil tooth 68 and applies an impact to the anvil 67.

After impact, the biasing force of the springs 72 pushes the annular cam 70 back to its normal angular position on the anvil 67 causing the hammer dog tooth 64 to be pushed axially rearward enough to clear the anvil tooth 68.

Figures 15, 16, 17:
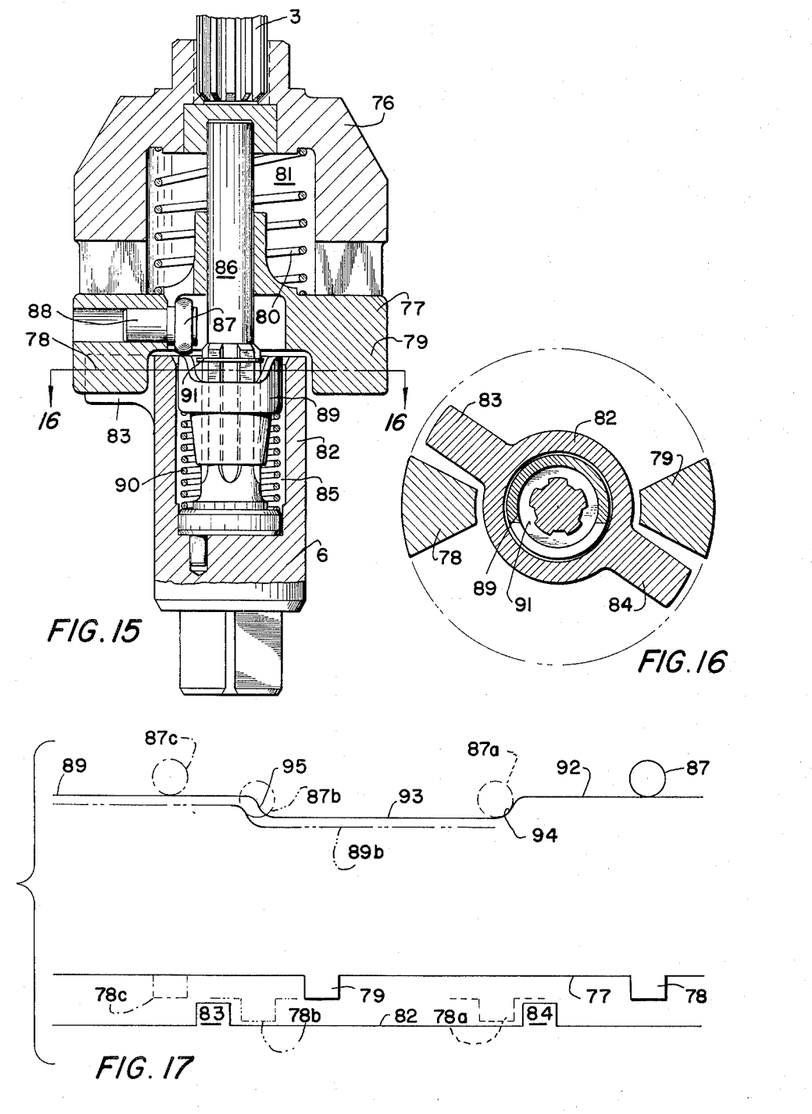
FIG. 15 is a longitudinal section of a fourth embodiment of impact mechanism shown immediately prior to impact.
FIG. 16 is a section taken on line 16—16 in FIG. 15.
FIG. 17 is a diagrammatic view illustrating the movements of the cam element and hammer and anvil dogs during the operation of the impact mechanism of FIG. 15.

FOURTH EMBODIMENT—FIGS. 15 TO 17

The fourth embodiment is similar to the second embodiment shown in FIGS. 9 to 11 except that it uses a plurality of hammer teeth and a plurality of anvil teeth whereas the second embodiment only uses a single hammer tooth 43 and a single anvil tooth 47. Although the fourth embodiment contains a plurality of both hammer and anvil teeth, it continues to provide only one impact during a full revolution of the hammer. This is considered necessary to allow the hammer enough movement to accelerate to a sufficient rotary speed between impacts.

The fourth embodiment includes a hammer rotor 76 splined to a motor shaft 3 in the same manner as in the earlier embodiments. The hammer 76 carries an axially sliding hammer dog 77 keyed to the hammer rotor 76 and including a pair of hammer dog teeth 78 and 79 located diametrically opposite each other. The hammer dog 77 is biased axially forward in the hammer rotor 76 by a spring 80 mounted in the cavity 81 of the hammer rotor 76.

An anvil 82 is integrally fixed on the rear end of a conventional spindle 6 and includes a pair of anvil teeth 83 and 84 projecting radially outward from the anvil 82 and angularly located diametrically opposite each other where they can be engaged by the hammer dog teeth 78 and 79 as the hammer 76 rotates.

The anvil 82 contains a central cavity 85 opening rearwardly and a central shaft 86 mounted in the cavity 85. The shaft 86 extends rearward into the hammer rotor 76 and is rotatably seated at its rear end in a seat or socket fixed in the bottom of the hammer cavity 81. The shaft 86 is keyed or splined to the anvil 82 so that it rotates with it.

A cam roller 87 is mounted in the interior of the hammer dog 77 by an axle pin 88 which extends radially inward from the hammer dog 77. The cam roller 87 rotates on the axil pin 88. The cam roller 87 rides on a tubular cam 89 which slides axially on the central shaft 86. The tubular cam 89 is splined on the central shaft 86 so that it cannot rotate relative to it. The tubular cam 89 is biased axially rearward by a spring 90 mounted in the anvil cavity 85. A lock ring 91 serves as a stop to limit the rearward movement of the tubular cam 89. The spring 90 is substantially stronger than the spring 80.

All of the foregoing structure is identical to the second embodiment shown in FIGS. 9 to 11 except that the hammer dog 77 carries two hammer dog teeth 78 and 79, instead of a single tooth, and the anvil 82 carries two anvil teeth 83 and 84, instead of a single tooth.

The rear end profile of the tubular cam 89 differs from the second embodiment by having a rearwardly projecting lobe 92 which extends angularly over a little more than 180 degrees of its circumference. The cam lobe 92 includes portions which are angularly located with both of the anvil teeth 83 and 84. The gap or spacing 93 between the ends of the lobe 92 is a little less than 180 degrees and extends angularly between the anvil teeth 83 and 84 on one side of the anvil 82.

It should now be apparent that the cam lobe 92 is arranged so that the cam roller 87 will roll up the rear end of the lobe 92 as the hammer dog teeth 78 and 79 approach the anvil teeth 83 and 84 in the angular relationship of the teeth shown in FIG. 15. Thereafter, the cam roller 87 will continue to ride on the cam lobe 92 for a little more than 180 degrees, until just after the hammer dog teeth 78 and 79 pass the anvil teeth 83 and 84 in the alternate angular relationship of the teeth. Causing the cam roller 87 to ride on the lobe 92 for this long prevents the mechanism from impacting more than once a full revolution of the hammer 76.

It is believed that the operation of this fourth embodiment is easily seen by the diagrammatic view shown in FIG. 17. This view is a flat presentation of the circumferences of the tubular cam 89, the hammer dog 77 and the anvil 82. The solid lines indicate one position of these members as the cam roller 87 rides on the cam lobe 92 and the anvil dog teeth 79 and 78, respectively, approach the anvil teeth 83 and 84. There will not be an impact of the teeth as they pass each other in this angular relationship due to the cam lobe 92 which holds the hammer dog 78 in a rearwardly raised position whereby the hammer teeth can clear the anvil teeth.

The dotted lines in FIG. 17 indicate further positions of the cam roller 87 and the hammer dog tooth 78. Immediately after the hammer dog tooth 78 passes the anvil tooth 84, the cam lobe 92 ends at 94 and the cam roller 87 rides down into the cam gap 93 to allow the hammer dog tooth 78 to move to its forward position as shown by the dotted line position 78a. The corresponding position of the cam roller is indicated by the position 87a.

Thereafter, the hammer dog tooth 78 continues to rotate and approach the anvil tooth 83. Immediately before the hammer dog tooth 78 engages the anvil tooth 83, shown by 78b, the cam roller 87 begins riding up the lagging end 95 of the cam lobe 89, as shown by 87b. If the hammer 76 is rotating at sufficient speed, the tubular cam 89 will be forced downward in the anvil 82, as shown in FIG. 15, to the dotted line position indicated by 89b in FIG. 17. This movement of the cam 89 allows the hammer dog tooth 78 to impact the anvil tooth 83.

After impact, the hammer 76 comes to a dead stop and may rebound. The previously compressed spring 90 expands to raise the tubular cam 89 back to the solid line position shown in FIG. 17 and to raise the hammer dog tooth 78 over the anvil tooth 83, whereby the hammer begins rotating again. The positions 87c and 78c indicate the cam roller 87 and hammer dog tooth 78 immediately after the tooth 78 passes the anvil tooth 83.

As in the second embodiment, if the hammer dog tooth 78 approaches the anvil tooth 83 at low rotary speed, the cam roller 87 will ride up the lagging end 95 of the cam lobe 92 without pushing the tubular cam 89 downwardly in the anvil 82 whereby the hammer dog tooth 78 is raised clear of the anvil tooth 83 without an impact taking place. This last operation is the same as in the first and second embodiments.

It will now be obvious that applicant's inventive concept includes an anvil and a hammer biased to a position wherein the hammer will impact the anvil, a pair of cam elements mounted between the anvil and hammer with one cam element mounted on the anvil and the other mounted on the hammer and arranged to lift the hammer clear of the anvil to prevent an impact when the cam elements do not move relative to their mounting members, and one of the cam elements being resiliently mounted on its mounting member so that it can move relative to such member when the cam elements abruptly engage at relatively high speed of the hammer whereby the cam elements fail to move the hammer clear of the anvil before the hammer impacts the anvil. Thus the cam elements prevent the tool from impacting at low hammer speed while allowing the tool to impact at high hammer speed.

It should be understood that the term "cam elements" as used in the description and claims includes the cam follower and the cam engaged by the cam follower. For example, in the first embodiment, shown in FIGS. 1 to 8, the "cam elements" will include the cam follower lobe 36 formed on the cam follower 27 and the cam lobe 38 formed on the annular cam 37.

Although preferred embodiments of the invention have been illustrated and described in detail, it will be understood that the invention is not limited simply to these embodiments but contemplates other embodiments and variations which utilize the concepts and teachings of this invention.

Having described my invention, I claim:

1. A rotary impact tool comprising:
   (a) a casing;
   (b) a rotary motor in said casing;
   (c) a motor and a rotor driven by said motor;
   (d) an anvil member rotatably mounted on said casing adjacent said rotor and having a spindle adapted to apply a series of rotary impacts to a workpiece;
   (e) an anvil tooth integrally fixed on said anvil member adapted to receive rotary impacts;
   (f) a hammer member including an integral hammer tooth, means mounting said hammer tooth on said rotor in a manner causing the hammer member to rotate with the rotor and allowing the hammer member to move on said rotor toward and away from said anvil member between alternate positions, one position being an impact position wherein the hammer tooth is located to strike said anvil tooth as said rotor turns and the other position being a non-impact position wherein the hammer tooth clears said anvil tooth as the rotor turns;
   (g) means biasing said hammer member toward its impact position;
   (h) a pair of cam elements cooperating to periodically bias said hammer member toward its non-impact position as said rotor turns relative to said anvil member, one of said cam elements being connected to said anvil member and the other cam element being connected to said hammer member, said cam elements being normally located relative to each other to cooperate and bias said hammer member toward said non-impact position as said hammer tooth approaches and passes said anvil tooth;
   (i) and a resilient means interconnecting at least one of said cam elements to its interconnecting member so that that cam element can move relative to its interconnecting member when said hammer tooth approaches said anvil tooth at high speed whereby said hammer tooth is not moved out of said impact position soon enough to avoid striking said anvil tooth.

2. A rotary impact mechanism comprising:
   (a) an anvil having an anvil tooth;
   (b) a hammer having a hammer tooth adapted to strike the anvil tooth for delivering a rotary impact thereto;
   (c) means supporting said hammer for movement relative to said anvil to a position wherein said anvil and hammer teeth can clear each other;
   (d) means for rotatively driving said hammer;
   (e) means biasing said hammer to a position wherein said anvil and hammer teeth collide as said hammer rotates;
   (f) cam means mounted between said anvil and hammer and operative, when remaining in a fixed normal position relative to said anvil and hammer, to lift said anvil and hammer teeth clear of each other to prevent a collision therebetween;
   (g) said cam means being mounted for movement relative to said anvil and hammer from said normal position wherein said cam means fails to lift said anvil and hammer teeth apart soon enough to prevent a collision;
   (h) and means biasing said cam means to said normal position with sufficient force to hold said cam means in said normal position during relatively slow rotary speed of said hammer.

3. A rotary impact tool comprising:
   (a) a casing;
   (b) a rotary motor in said casing and a rotor driven by said motor;
   (c) an anvil rotatably mounted on said casing for rotation relative to said rotor;
   (d) a hammer means mounting said hammer on said rotor for positive rotation with it and for movement toward and away from said anvil between an impact position wherein said hammer delivers a rotary impact to said anvil and a non-impact position wherein the hammer can rotate free of the anvil;
   (e) a pair of cam elements interconnected between said anvil and hammer and arranged to normally move said hammer to said non-impact position when said rotor turns at a relatively slow speed;
   (f) and resilient means supporting at least one of said cam elements so that said one cam element can move relative to said hammer when engaged at high speed of said rotor whereby said cam elements fail to move said hammer out of the way of said anvil resulting in said hammer impacting said anvil.

4. A rotary impact mechanism comprising:
   (a) a frame;
   (b) an anvil rotatably mounted on said frame;
   (c) a hammer rotatably mounted on said frame, means mounting said hammer for movement relative to said anvil between an impact position wherein it delivers a rotary impact to said anvil and a non-impact position wherein it can rotate free of the anvil;
   (d) a pair of cam elements interconnected between said anvil and hammer, one of said cam elements being mounted on said anvil and the other being mounted on said hammer, said cam elements being operative in their normal positions on their respective mounting members to engage and move said hammer to said non-impact position wherein said hammer does not impact said anvil;
   (e) and means mounting one of said cam elements on its mounting member for movement relative to said mounting member so that it moves out of its normal position when said cam elements engage at high rotary speed of said hammer and fails to move said hammer to said non-impact position soon enough to prevent said hammer from impacting said anvil.

5. The impact mechanism of claim 4 including:
(a) first spring means biasing said movably mounted cam element to its normal position;
(b) and second spring means biasing said hammer toward said impact position, said second spring means being weaker than said first spring means.

6. The impact mechanism of claim 5 including:
(a) means mounting said hammer for movement axially toward and away from said anvil between said impact position and said non-impact position.

7. The impact mechanism of claim 5 including:
(a) means mounting one of said cam elements on said hammer for axial movement relative to it and keying said one cam element to said hammer for rotation with it;
(b) and said one cam element being biased toward its normal position relative to said hammer by said first spring means.

8. The impact mechanism of claim 7 including:
(a) means fixing the other cam element on said anvil.

9. The impact mechanism of claim 8 wherein:
(a) said hammer includes a hammer rotor and a hammer dog slidably mounted in said hammer rotor;
(b) and said one cam element is slidably keyed to said hammer dog so that it is forced to rotate with the hammer dog while it can slide axially relative to it.

10. The impact mechanism of claim 6 including:
(a) means mounting one of said cam elements on said anvil for movement relative to said anvil from its normal position on the anvil.

11. The impact mechanism of claim 10 wherein:
(a) the cam member on said anvil is movable axially relative to the anvil and keyed to the anvil;
(b) and said first spring means is mounted on said anvil and biases the cam element on the anvil to its normal position.

12. The impact mechanism of claim 10 including:
(a) means mounting said cam element on said anvil for limited rotary movement relative to the anvil;
(b) and said first spring means being mounted on said anvil and rotatively biases said cam element on the anvil to its normal position on the anvil.

13. The impact mechanism of claim 4 wherein:
(a) said hammer includes a plurality of angularly spaced hammer teeth and said anvil includes a corresponding number of angularly spaced anvil teeth; and
(b) said cam elements are arranged to prevent the hammer teeth from impacting the anvil teeth as the hammer teeth approach and pass the anvil teeth in at least one angular relationship of the hammer and anvil teeth.

References Cited by the Examiner

UNITED STATES PATENTS 2,339,530    1/44    Van Sittert et al. _______ 192—30.5
3,070,201    12/62    Spyridakis ____________ 192—30.5

DAVID J. WILLIAMOWSKY, *Primary Examiner.*